(12) United States Patent
Journot

(10) Patent No.: US 7,952,816 B2
(45) Date of Patent: May 31, 2011

(54) OPTICAL SYSTEM FOR PROCESSING A LIGHT BEAM

(75) Inventor: Eric Journot, Saint Selve (FR)

(73) Assignee: Commissariat a l'Energie Atomique, Paris (FR)

( * ) Notice: Subject to any disclaimer, the term of this patent is extended or adjusted under 35 U.S.C. 154(b) by 150 days.

(21) Appl. No.: 12/521,556

(22) PCT Filed: Dec. 24, 2007

(86) PCT No.: PCT/EP2007/064536
§ 371 (c)(1),
(2), (4) Date: Jun. 26, 2009

(87) PCT Pub. No.: WO2008/080916
PCT Pub. Date: Jul. 10, 2008

(65) Prior Publication Data
US 2010/0321799 A1    Dec. 23, 2010

(30) Foreign Application Priority Data
Dec. 28, 2006    (FR) ..................... 06 56020

(51) Int. Cl.
*G02B 9/00*    (2006.01)
(52) U.S. Cl. ......... 359/738; 359/629; 359/744; 359/795

(58) Field of Classification Search .................. 359/629, 359/722, 726–732, 738, 744, 754–758, 763–766, 359/771–778, 784, 789, 793, 795
See application file for complete search history.

(56) References Cited

U.S. PATENT DOCUMENTS
4,861,148 A * 8/1989 Sato et al. ..................... 359/366
5,040,886 A    8/1991 Gunter FOREIGN PATENT DOCUMENTS
EP    0240194 A1    10/1987
EP    0721113 A2    7/1996
JP    11032278    2/1999

* cited by examiner

*Primary Examiner* — Darryl J Collins
(74) *Attorney, Agent, or Firm* — Nixon Peabody LLP

(57) ABSTRACT

Optical system for processing a light beam comprises first and second optical means that are convergent and divergent respectively and form an afocal optical device. The first optical means comprises a single convergent lens. According to the invention, this convergent lens provides an order 0 beam and an order 2 beam resulting from the light beam to be processed passing through this lens after having been subjected to a 0 reflection and 2 reflections respectively on the lens faces, and the lens is optimised for the order 2 beam and has an aperture f/# less than 4 for this order 2 beam, with a wave front quality less than λ peak-to-valley, where λ is the wavelength of the light beam to be processed.

5 Claims, 2 Drawing Sheets

OPTICAL SYSTEM FOR PROCESSING A LIGHT BEAM

CROSS REFERENCE TO RELATED APPLICATIONS OR PRIORITY CLAIM

This application is a national phase of International Application No. PCT/EP2007/064536, entitled "OPTICAL SYSTEM FOR PROCESSING A LIGHT BEAM", which was filed on Dec. 24, 2007, and which claims priority of French Patent Application No. 06 56020, filed Dec. 28, 2006.

DESCRIPTION

1. Technical Domain

This invention relates to an optical system for processing a light beam.

More particularly, the invention relates to the optimisation of parasite imagery of a lens for the analysis of a laser beam.

The invention is particularly applicable to the field of large dimension power lasers, lasers with beams with diameters of more than 1 cm, and can be used to design a compact and inexpensive beam analysis system.

Complete knowledge of a laser beam requires the measurement of the distribution of energy and phase of the beam in space in a given plane. When the dimensions of the beam are large compared with the size of CCD type sensors, the transverse size of the beam has to be reduced while deteriorating the beam as little as possible.

In the case of a laser beam, it is also essential to very strongly reduce the energy of the beam to be analysed.

Note now that this invention makes it possible to design a very compact good quality beam reduction system with weak transmission, for arbitrary transverse size beams.

The invention is also more and more relevant now that the size and the energy of laser beams are becoming greater.

2. State of Prior Art

Many beam expander type optical systems have been developed to reduce the size of a laser beam without deteriorating it.

These systems are Galilean type sights (comprising an entry optical unit, or primary unit, and an exit optical unit, or secondary unit) to prevent any risk of breakdown at a focus, or off-axis telescopes, without central blanking.

These known systems operate well but they are large and expensive when the beam size increases.

In known Galilean type systems, the entry optical unit comprises several lenses and it must be only slightly open—the f/# aperture of this unit must be typically more than 4—to avoid creating any aberration. The cost of the entry optical unit thus increases very quickly if the beam diameter exceeds 5 cm.

Alignment of an off-axis telescope is also very difficult.

PRESENTATION OF THE INVENTION

The purpose of this invention is an optical processing system for a light beam, particularly a system that can be used to analyze a laser beam, this system being simpler than Galilean type systems mentioned above.

Specifically, the purpose of this invention is an optical system for processing a light beam, this optical system comprising first and second optical means that are convergent and divergent respectively and form an afocal optical device, the first optical means comprising a single convergent lens, this optical system being characterised in that this convergent lens provides an order 0 beam and an order 2 beam resulting from the light beam to be processed passing through this lens after having been subjected to a 0 reflection and 2 reflections respectively on the lens faces, and the lens is optimised for the order 2 beam and has an aperture f/# less than 4 for this order 2 beam, with a wave front quality less than λ peak-to-valley, where λ is the wavelength of the light beam to be processed.

The power of the lens for the order 0 beam is preferably less than the power of the lens for the order 2 beam.

Preferably, the second optical means is designed to collimate the order 2 beam and to make the order 0 beam diverge.

According to one preferred embodiment of the invention, the optical system also comprises an afocal optical means designed to focus the order 2 beam and eliminate the order 0 beam.

This afocal optical means may include third and fourth optical means that are convergent and convergent respectively and have a common focus and a diaphragm that is placed at this common focus.

BRIEF DESCRIPTION OF THE FIGURES

This invention will be better understood after reading the description of example embodiments given below for information only and in no way limitative, with reference to the attached drawings in which.

DETAILED PRESENTATION OF PARTICULAR EMBODIMENTS

Figure 1:
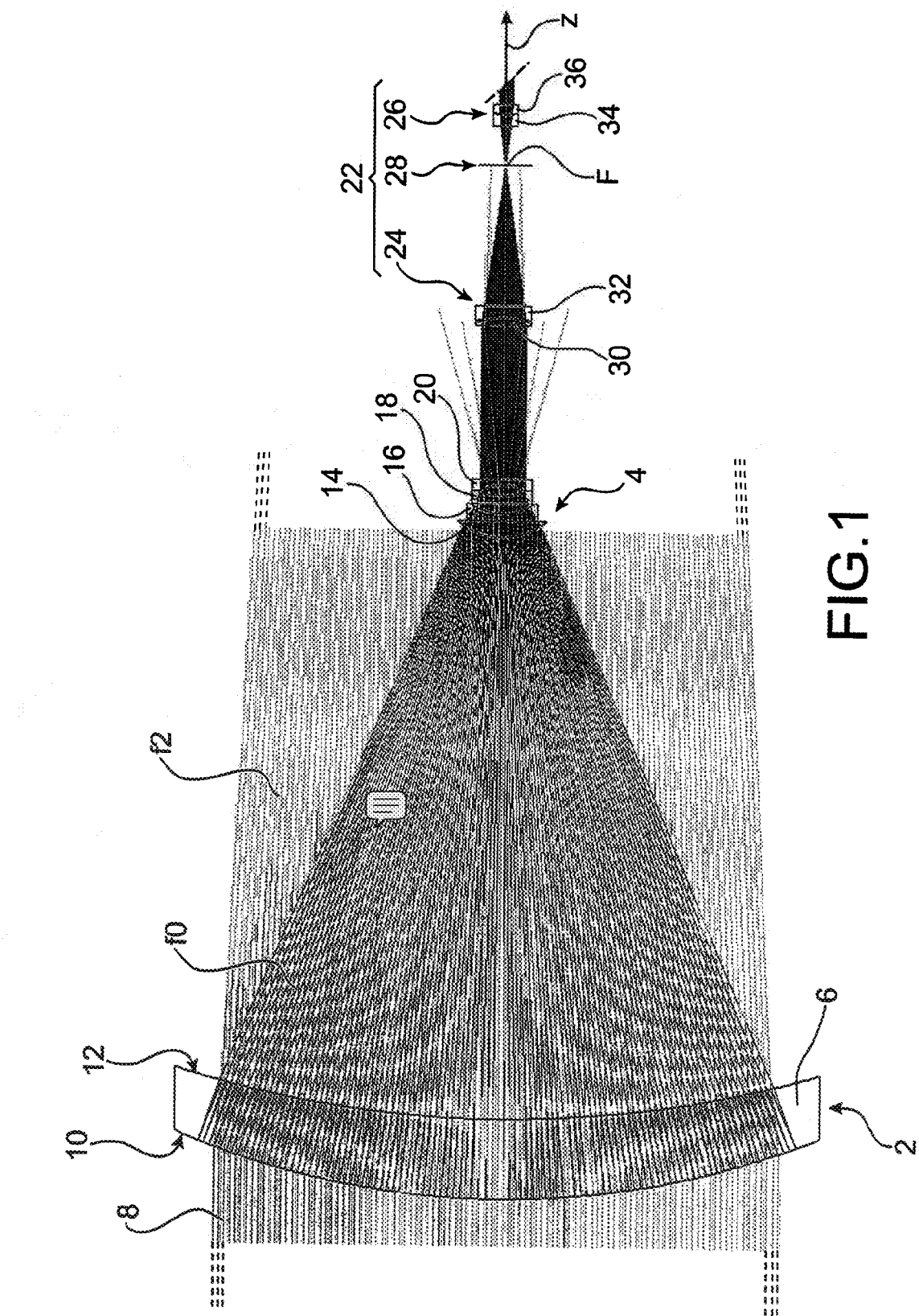
FIG. 1 is a schematic sectional view of a particular embodiment of the optical system according to the invention.

The Galilean type optical system according to the invention that is schematically shown in FIG. 1 comprises a first convergent optical means 2 or primary unit, and a second divergent optical means 4 or secondary unit, for which the common optical axis is shown in the figure with reference Z.

According to the invention, primary unit 2 is as simple as possible: it consists of a single convergent lens 6 only.

The system is designed to process a monochromatic incident light beam 8, for example to analyze this beam to determine the distribution in space of the energy and the phase of the beam in a given plane, respectively.

Starting from this beam 8, the lens 6 supplies an order 0 beam, or order 0 image, that is marked reference f0 in the figure, and an order 2 beam, or order 2 image, that is marked with reference f2. This order 2 beam is the result of two reflections of the incident beam 8 on the entry and exit faces 10 and 12 of the lens 6, namely a reflection on the exit face 12 and then a reflection on the entry face 10 that receives the beam 8 first.

The lens 6 is optimized for its order 2 image that is considered as being parasite in prior art, rather than its order 0 image as was done in prior art, to guarantee good optical quality and a compact system.

Thus, there are four diopters to optimise the quality of the primary unit, given that each face of the lens is seen twice by the beam 8.

This optimisation consists of calculating the radii of curvature of the faces 10 and 12 of the lens 6 such that with respect to the order 2 beam, the lens has an aperture f/# less than 4, with a wave front quality less than λ PV, where PV means "peak to valley" and λ is the wavelength of the monochromatic incident beam.

For example, the primary unit 2 is optimised such that its aperture f/# is typically equal to 1.3 and the wave front quality is less than $\lambda/2$ PV.

Transmission of the primary unit 2 varies from 0.01% to 5.25% depending on the processing applied on the faces 10 and 12 of the lens 6, which actively participates in the necessary attenuation of the beam 8 without reducing the quality of this beam.

The power (the inverse of the lens focal distance) of the lens obtained is very small for an order 0 classical image and very large for an order 2 image. The convergence difference of the order 0 and 2 beams is used to eliminate the order 0 beam.

As in a conventional system, all other optical components of the system in FIG. 1 are anti-reflection treated at the usage wavelength, in other words the wavelength of the incident beam 8.

The secondary optical unit 4, for which the association with the primary unit 2 forms an afocal system, collimates the order 2 beam while strongly diverging the order 0 beam.

In the example, the association of order 2 units 2 and 4 forms a Galilean system for which the absolute value of the magnification G is less than 20, for practical implementation reasons.

In the example in FIG. 1, the secondary unit 4 is composed of a convergent lens 14 and three divergent lenses 16, 18 and 20 successively that have the same optical axis, namely the Z axis.

The system shown in FIG. 1 also comprises an afocal device 22, for which the magnification is close to −1, to completely eliminate the order 0 beam, solve the pupillary imagery problems and possibly adjust the dimension of the beam output from the system to the CCD sensor (not shown) that will analyse this beam.

In the example, this afocal device 22 comprises:
  a third optical unit 24 and a fourth optical unit 26 that have a common optical axis, namely the Z axis and a common focus F, located between these units 24 and 26, on the Z axis and
  a diaphragm 28 that is placed in this focus F.

Each of the units 24 and 26 may be composed of two lenses or two doublets. In the example, the unit 24 comprises a convergent lens 30 and a divergent lens 32 successively, and the unit 26 comprises a divergent lens 34 and a convergent lens 36 successively as shown in FIG. 1.

The assembly composed of units 24 and 26 and the diaphragm 28 forms a spatial filter in which the function of the third unit 24 is to focus the order 2 beam and to completely eliminate the order 0 beam, and the function of the fourth unit 26 is to recollimate the order 2 beam.

Use of a double reflection in the lens of the primary unit makes it possible to design a sampling system that is three to four times more compact than a conventional afocal system, while having the same optical quality as the conventional system.

Figure 2:
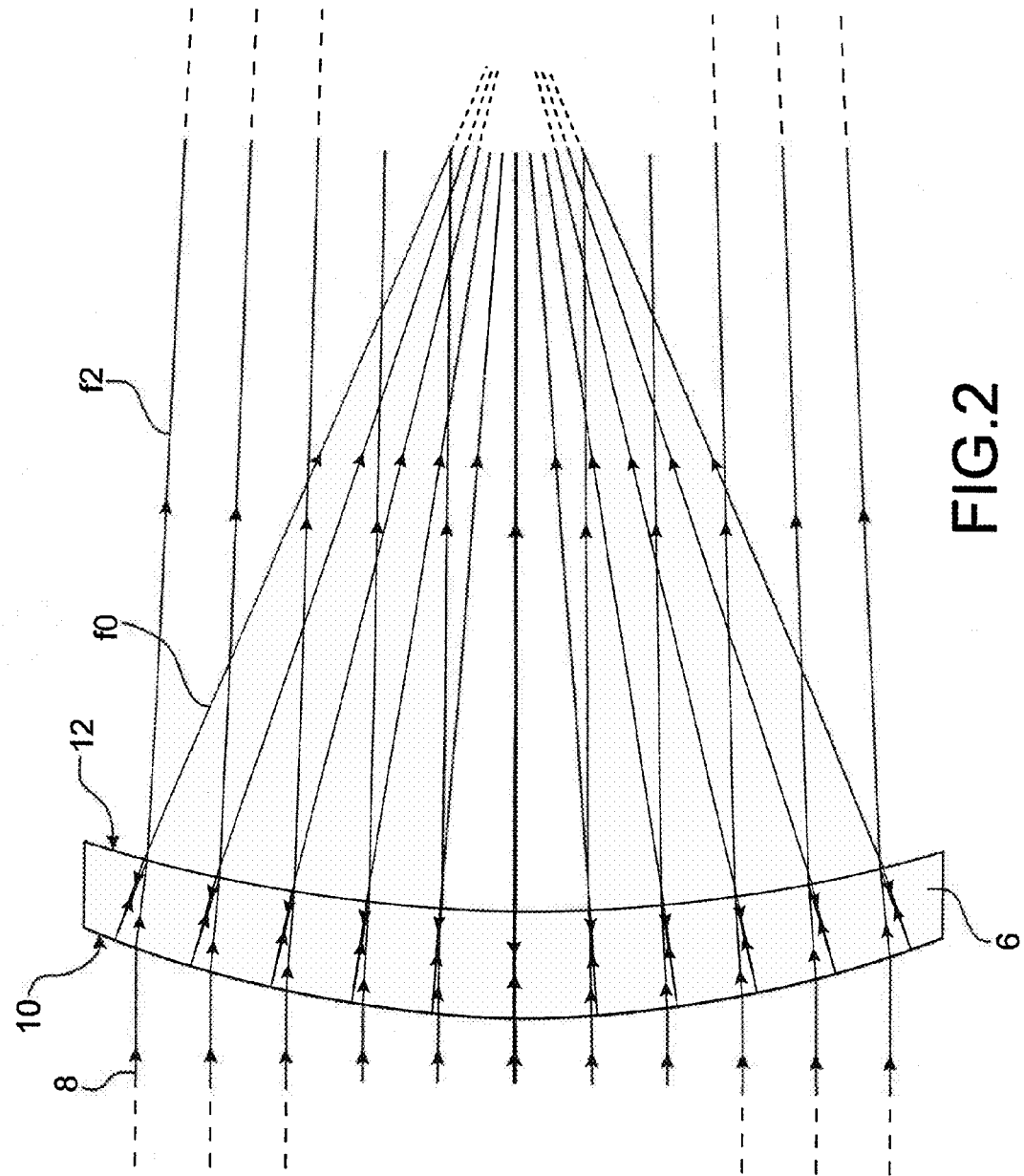
FIG. 2 is a schematic sectional view of a lens according to the invention.

This invention is innovative in that it uses parasite reflection in a lens 6 (FIG. 2) to make a very open component with a good optical quality.

According to the invention, given an incident beam 8, this lens is optimised for the order 2 beam (reference f2) that is reflected on the exit face 12 and on the entry face 10 of the lens, and not for the order 0 beam (reference f0), that is refracted by the diopters corresponding to these two faces respectively.

The cost and integration of the solution used in this invention is better than for a conventional afocal system, for a laser beam with a diameter greater than 50 mm.

Note also that in this invention, the concept of the useful signal and parasitic signal are inverted.

Conventionally, attempts are always made to eliminate parasitic reflections in an optical system while in this invention, this phenomenon is used to make a system that is more efficient than the conventional design.

For example, an optical system according to the invention may be used:
  with a light beam with a diagonal of 70 mm, using a set of primary-secondary units 2-4 with a magnification equal to −13, and an afocal device 22 with a magnification equal to −1,
  or with a light beam with a diagonal equal to 560 mm, using a set of primary-secondary units 2-4 with a magnification equal to −13, and an afocal device with a magnification equal to −3.

The invention claimed is:

1. Optical system for processing a light beam, this optical system comprising first and second optical means that are convergent and divergent respectively and form an afocal optical device, the first optical means comprising a single convergent lens, this optical system being characterised in that this convergent lens provides an order 0 beam and an order 2 beam resulting from the light beam to be processed passing through this lens after having been subjected to a 0 reflection and 2 reflections respectively on the lens faces, and the lens is optimised for the order 2 beam and has an aperture f/# less than 4 for this order 2 beam, with a wave front quality less than $\lambda$ peak-to-valley, where $\lambda$ is the wavelength of the light beam to be processed.

2. Optical system according to claim 1, in which the power of the lens for the order 0 beam is less than the power of the lens for the order 2 beam.

3. Optical system according to claim 2, in which the second optical means is designed to collimate the order 2 beam and to make the order 0 beam diverge.

4. Optical system according to claim 3, also comprising an afocal optical means, designed to focus the order 2 beam and eliminate the order 0 beam.

5. Optical system according to claim 4, in which the afocal optical means comprises third and fourth optical means that are convergent and convergent respectively and have a common focus (F), and a diaphragm that is placed at this common focus.

* * * * *